UNITED STATES PATENT OFFICE.

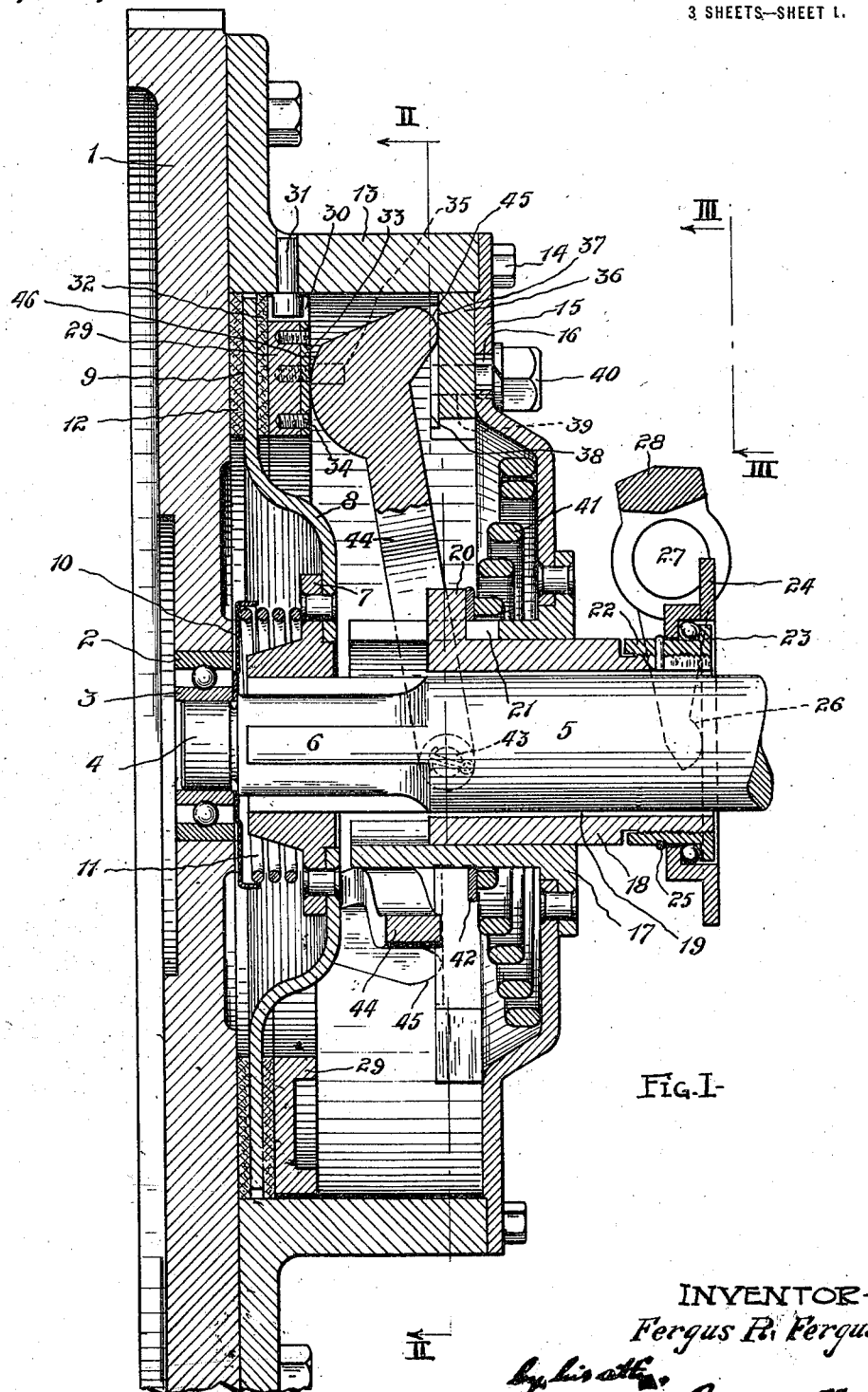
Fig. I.
INVENTOR-
Fergus R. Ferguson

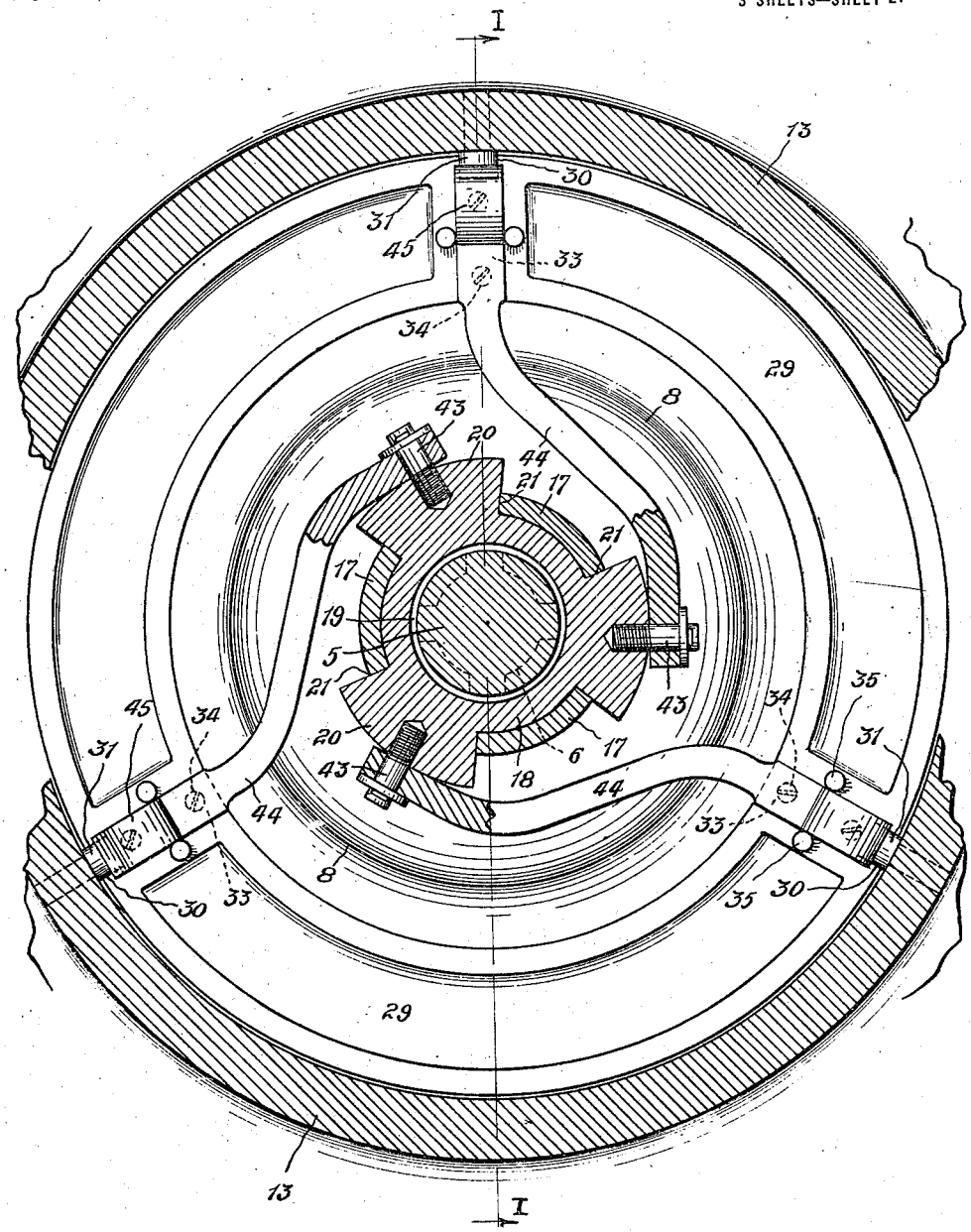
FIG. II

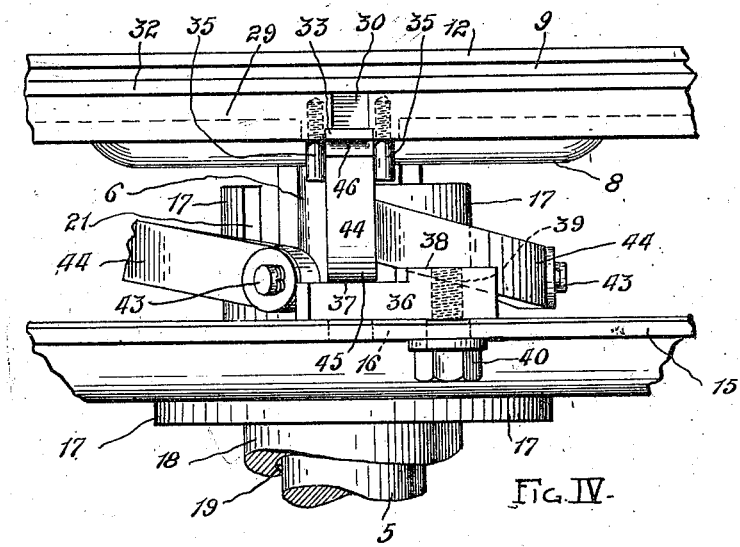
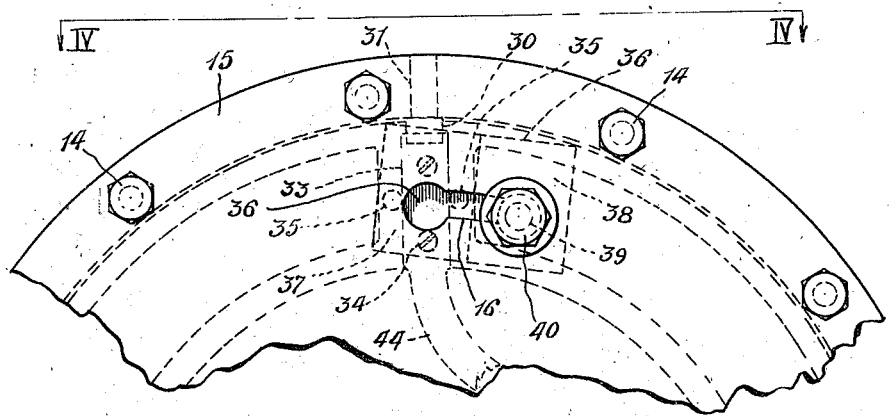
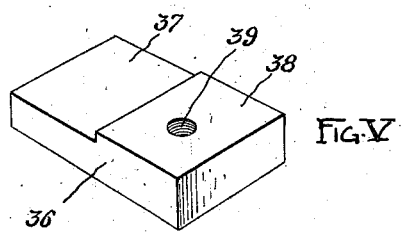

FERGUS R. FERGUSON, OF CLEVELAND, OHIO, ASSIGNOR TO THE COLUMBIA CLUTCH COMPANY, OF CLEVELAND, OHIO, A CORPORATION OF OHIO.

CLUTCH.

1,300,831.     Specification of Letters Patent.     Patented Apr. 15, 1919.

Application filed November 4, 1916. Serial No. 129,607.

*To all whom it may concern:*

Be it known that I, FERGUS R. FERGUSON, a citizen of the United States, residing at 2053 East 88th St., in the city of Cleveland and State of Ohio, have invented a new and useful Improvement in Clutches, of which the following is a specification, the principle of the invention being herein explained and the best mode in which I have contemplated applying that principle, so as to distinguish it from other inventions.

My invention pertains to a clutch and more particularly to specific improvements involving the arrangement and mode of connection of certain parts of a common type adapted for the transmission of power in automobiles.

I am quite familiar with the different kinds of friction clutches on the market. They have been placed in the fly wheel, upon the main drive gear and upon the rear end of the crank shaft. Those of the single plate type like that which this application will exemplify employ friction pads adapted to engage opposite sides of the plate. Many clutches have employed an actuating sleeve which had sliding contact with a shaft. Such an arrangement was a fundamental error responsible for relative distortion of the parts and in consequence for the straining and wear thereof with attendant uneven transfer of power and inevitable noise. The actuating sleeve required lubrication like any ordinary bushing and it was difficult to restrict the application of oil to that point. It has also been common practice heretofore, so far as my knowledge extends to attach the outer ends of the pressure arms besides having their inner ends connected with the sleeve. This necessitated a loose and hence rattling connection at the shaft in order to permit the approach of the arms toward a common transverse plane. Furthermore, the constant torsional and centrifugal forces caused the spiral clutch spring to creep around on its collar so persistently as in time to wear off the retaining shoulder thereon and even before such happening to occasion knocking.

The chief object of my invention is to avoid noise.

This I attain by a feasible structure which is simple, strong and economical of manufacture, and includes as features:

1. One piece long leverage pressure arms permanently attached to a disengaging sleeve.
2. Hardened and ground surface connection at outer ends of pressure arms.
3. No need of a mechanical release, but instead a dependence primarily upon the established inertia.
4. Facility of adjustment or replacement due to wear.
5. No contact had and hence no lubrication required between the shaft and an interior bushing.
6. Confinement of spring so as to prevent its creeping and consequent wearing action.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawings:

Figure I is a medial section of a clutch, embodying my invention, certain parts, however, being seen in elevation.

Fig. II is a section on line II II of Fig. I looking in the direction of the arrows.

Fig. III is a partial plan view of the rear of the clutch as suggested by the indicating arrows on Fig. I.

Fig. IV is a plan of Fig. III viewed as indicated by the arrows on line IV IV and with a portion of the cover removed.

Fig. V is a perspective view of one detail.

The clutch mechanism is shown in the drawings to be associated with a fly wheel 1 provided centrally with a ball bearing including a race 2 movable therewith. The other race 3 of the bearing is mounted upon the forward reduced end 4 of a shaft 5. This shaft is provided with a quadruple spline 6 to which a hub 7 is keyed for limited sliding movement thereon. Riveted to the hub 7 is a plate 8 having annular flat surfaces 9. Interposed between the hub 7 and the race 3 is a washer 10 slightly dished on its front side to avoid the race 2 and held in place by a spring 11 interposed between it and the hub 7. Disposed between one of the surfaces 9 and the fly wheel 1 is a suitable friction pad 12.

Carried by the fly wheel is a cover flange 13 and attached to it by means of cap screws 14 is a cover plate 15. Such plate is provided around its outer edge with three equi-spaced slots 16, the configuration of which are such as to have two circular ends and a somewhat constricted middle portion as appears in Fig. III. Carried by the inner edge of the cover plate 15 is a hub 17, and within this hub is a sleeve 18 spaced from the shaft 5 as appears at 19 in Fig. I. This sleeve is the medium by which the interior clutch mechanism is to be actuated to disengaging position and its spacing from the shaft is one of the purposeful features of this invention. The sleeve 18 carries three ears 20 which project through suitable elongated slots 21 in the hub 17 in order to permit of relative movement therebetween in the direction of the axis of the shaft, but not relative rotative action. The rear end of the sleeve 18 projects beyond the cover plate 15 and hub 17 and carries with a screw threaded connection a ball bearing collar 22 having a flange 23 adapted in conjunction with a flanged member 24 to constitute another ball bearing to be held in place by a locking spring 25. The front side of the flange of the member 24 is adapted to be engaged and moved in a rearward or disengaging direction by a forked lever 26 pivoted at a fixed point 27 and articulating at 28 in any approved manner with a foot pedal.

An annular block 29 having slots 30 is carried interiorly by the cover flange 13 by means of pins 31 and in juxtaposition to the surfaces 9 and pad 12. Interposed between the block 29 and the nearer of the surfaces 9 is another friction pad 32. As so arranged and as is clearly shown in Fig. I the surfaces 9 are opposed to the friction pads 12 and 32 respectively in the usual manner. On its rear side the block 29 carries removable wearing surfaces 33 secured thereto by means of screws 34. Also projected from the block 29 are a pair of pins 35 shown in Figs. I, II and IV and the purpose of which will hereinafter appear.

Detachably secured to the cover plate 15 opposite the fly wheel 1, a given distance from the block 29, are three wearing plates 36 having hardened surfaces 37 and 38 in stepped relation. Extending into one of the surfaces is a screw threaded opening 39 with which the threads of a body bolt 40 which is passed through each of the slots 16 are adapted to coact. In this way, by loosening the bolts 40 and withdrawing them a suitable distance the plates 36 may be moved along the slot 16 so as to bring either the surfaces 37 or the surfaces 38 into position substantially opposite the wearing surfaces 33 respectively. The object of providing an adjustment of this character will be explained later.

The usual spiral spring 41 is situated between the cover plate 15 and the ears 20, though rearwardly adjacent the latter so as to afford an annular abutting surface, which is moreover removable, is a washer 42. On its other side the spring 41 is retained in place by the corner formed incident to the rearwardly bent shape of the inward portion of the cover plate 15. Such a confinement of the spring, which is of sufficient strength normally to insure an effective bite at the friction surfaces, results in an avoidance of creeping around because the relative rotative movement between the sleeve 18 and the cover plate 15, if present at all, is insufficient to occasion it. In prior constructions, known to the market, the interaction between the shaft and an actuating sleeve which was mounted in contact therewith invariably caused such a creeping on the part of the spring and this rapidly wore its retaining collar; in some instances wore it off entirely.

Each of the ears 20 carries a stud 43 to each of which is pivoted an integral pressure arm 44, so that it may swing tangentially thereto. It is to be observed that the arms 44 do not follow the shortest distance from their point of attachment to the annular space confined by the opposed surfaces 33 and 37, but instead, are of such shape as to intersect such space about 90° away from the place where they would intersect it if extended radially or the shortest distance outwardly from their respective studs 43. In this manner the length of the pressure arms is increased to an extent which enables them to exert as effective a leverage as if they equalled the maximum radial distance of the clutch proper. This is evident in Fig. I. The outward and floating extremities of the pressure double cam surface arms 44 are of peculiar configuration and besides being guided each between a pair of the pins 35 are fashioned with substantially opposite curved surfaces 45 and 46 respectively. The arms 44 apply pressure at their surfaces 45 each against one of the surfaces 37, whereas the surfaces 46 are adapted to be contiguous to and bear against the wearing surfaces 33 respectively so as to produce a double cam action thereagainst in response to the action of the spring 41 which constantly tends to move the sleeve 18 and in consequence the pivots of the pressure arms in a forward direction. The surfaces 45 and 46 will, of course, in practice be hardened and ground. From the foregoing description it will be perceived that the action of the pressure arms 44 is positive, firm and uniform and quite independent of any vibration on the part of the shaft 5 owing to the fact that the latter is out of contact with the actuating member to which the pressure arms are solely connected. Moreover, the arms afford great leverage and hence require a conformably light clutch spring and insure ease and smoothness of action. This is owing to the fact that the pivot point and pressure point of each of the arms 44 are in perpendicularly related axial planes.

The operation of the clutch is as follows:

As is now evident the clutch is of the single plate type wherein the plate is carried upon the shaft to be driven and normally adapted to be clamped between a pair of friction pads by strong spring action and to be disengaged at the will of the operator, usually by actuating a foot pedal which readily overcomes the resistance of the spring. When the pedal is depressed the flange 24 is pushed rearwardly and hence draws the sleeve 18 with it. Thus the pivots of the three pressure arms are moved and the outer ends of the latter caused to slide inwardly and turn at the places where pressure is established at the points of contact of the surfaces 37 and 45. It is obvious that such action is smooth yet strong and positive, and owing to the contour and spacing of the surfaces 37 and 46 the application of pressure against the wearing surfaces 33 is gradually and uniformly released. In the meantime the inertia of the parts suffices to effect a separation of the friction surfaces though the spring 11 aids slightly as a mechanical release of the plate 9 from the front pad 12. During this time the rigid and integral character of the pressure arms and the manner in which their outer ends are additionally guided between the pins 35 precludes looseness and therefore rattle. When the force exerted by the spring 41 is again permitted to become effective against the washer 42 and thence uniformly against the three ears 20, the forward return of the sleeve 18 and the firm cam-like action of the surfaces 46 ocurs to clamp the clutch plate 9 between the pads 12 and 32. If the transmission of power is to result, as when the fly-wheel 1 is rotating, it is manifestly important to have the strains evenly apportioned and this is possible only if there is no relative distortion between the driving parts and the parts to be driven. It is the discovery that dissatisfaction could be more often traced to deflections that led me to devise a way of supporting the clutch control mechanism without requiring any bushing whatsoever nor any lubricant about the shaft. Accordingly, I contrived to have an air space between the shaft 5 and the actuating sleeve 18 to which the inner ends of the pressure arms 44 were attached. By this means the inner connections of the arms are ever independent of the shaft and therefore always in line with the outer ends of the arms whereby their movement toward an assumption of work is substantially concerted and on the other hand their reverse movement enabled to effect a uniform release. The provision of an air space between the shaft 5 and the actuating sleeve 18 presents an incidental advantage. Just as transmissions are provided with vents to relieve the interior air pressure and avoid the escape of oil therefrom, so my novel clutch structure utilizes any air pressure established interiorly, however slight, to resist the entry of oil from the outside. During the actual transmission of power the confinement of the spring 41 by parts not supported against the shaft serves to steady the same and minimize relative movement distinct from its flexures. With my arrangement both ends of the spring are bodily rotated at the same speed. Heretofore a binding action between the shaft and the actuating sleeve or any vibration caused the spring to creep around and frequently to entirely wear off its retaining collar. Due to wear of certain parts it becomes necessary to provide take-up facilities wherefore I have incorporated two. It will be noticed that the collar 23 is not screwed tightly against the shoulder on the sleeve 18 where its threads terminate. This affords an initial adjustment when occasion shall require. The other which is less delicate lies in the substitution of the surfaces 38 for the surfaces 37. This reduces the range of action of the hardened and ground surfaces 45 and 46 to such an extent as to require that the collar 23 be partially unscrewed from the sleeve 18 and so assume a position to permit of repeating its take-up movement when the surfaces 38 have in their turn become enough worn to so warrant.

Everyone familiar with prior constructions of this kind has realized how unavoidably sensitive they are, and how readily they communicate the existence of disorders by the annunciation of rattles or knocks and by the lack of precision in making and breaking the transmission of the motive power. All these occurrences involve noise or the development of conditions certain to produce it. Prolonged practical tests have demonstrated that the features of my construction, as combined, achieve pronounced advantages in the way of efficiency and durability.

I claim:—

1. A clutch comprising a rotatable driving cover flange, a shaft to be driven, friction pads carried by said flange, a plate carried by said shaft and having a surface extending between said pads, a plurality of pairs of members having wearing surfaces also carried by said flange adjacent to one of said pads, pressure arms attached for movement along said shaft, said arms having curved surfaces projecting between and engaging said members respectively whereby to press one of said members toward said plate and means for adjusting correspondingly located of said members whereby to vary the confinement of said arm surfaces.

2. A clutch comprising a rotatable driving member, a shaft to be driven, friction pads carried by said member, a structure carried by said shaft and having a surface extending between said pads, sets of wearing blocks also carried by said member and arranged in juxtaposed pairs, pressure arms movably attached for movement along said shaft, said arms having curved surfaces projecting between and engaging said separated pairs of blocks respectively whereby a separating cam action may be had, the opposed surface of one set of said blocks presenting portions of varying projection, and means for adjusting said set whereby to compensate for wear.

3. A clutch comprising a rotatable driving member, a shaft to be driven, friction elements carried in juxtaposition by said member and shaft respectively, a sleeve carried by said member for movement constantly out of contact with and in the direction of the axis of said shaft, pressure arms each having inner ends pivoted to said sleeve so as to be movable in a plane substantially parallel to its axis and having outer ends fashioned with integral cam surfaces intersecting axial planes at angles of about ninety degrees to the axial planes of the pivots respectively whereby to lengthen the effective leverage, one such surface being contiguous to one of said friction elements, a spring tending to move the sleeve in one direction, means for moving said sleeve in the opposite direction and abutment means coacting with the other cam surfaces of said arms whereby a movement of said sleeve causes said elements to approach or recede from each other.

4. A clutch comprising a rotatable driving member, a shaft to be driven, friction elements each movably carried and in juxtaposition by said member and shaft respectively, a backing carried by said member, a sleeve carried by said member so as to surround said shaft while constantly held out of contact therewith, said sleeve being movable in the axial direction of said shaft, rigid pressure arms pivoted around said sleeve and having their outer ends fashioned with a cam surface positioned between said backing and the adjacent of said friction elements, whereby a given direction of movement of said sleeve causes the engagement of said elements, and means for actuating said sleeve.

5. A clutch comprising a fly wheel, a shaft, a plate carried by said shaft, a pair of members carried upon said fly wheel and having circumferentially arranged wearing surfaces spaced apart in opposed pairs, one of said members being movable relatively to the other and to said plate, a set of pressure arms extending between said pair of members, and having each a pair of integral curved surfaces, adapted to be in engagement with said opposed wearing surfaces respectively and to have oscillatory and sliding interaction therewith.

6. A clutch comprising a rotatable driving member, a shaft to be driven, friction surfaces carried in juxtaposition by said member and shaft respectively, one such surface being movable, a hub carried solely by said member, a sleeve carried in said hub, means for actuating said sleeve, and a spring confined by said member and said sleeve for resisting the actuation of said sleeve, said spring confining member and sleeve being interlocked for rotation together whereby both ends of the spring may rotate bodily at the same speed to prevent creeping thereof around its seat and consequent wear, and pressure arms pivoted to said sleeve in equi-spaced radial planes and laterally offset intermediately of their ends, each of the latter having free ends provided with oppositely disposed curved surfaces adapted to have a double cam action between said driving member and said movable friction surface.

7. A clutch comprising a driving member, a member to be driven, a friction surface carried by each of said members, said surfaces being opposite to each other, a clutch device including; a hub, a sleeve therein, pressure arms connected to said sleeve adapted to be swung tangentially thereto, the outer end of each arm being free and provided with an integral cam surface adapted to oscillate between and bear against said friction surfaces, and a spring confined by said hub and sleeve for effecting the clutching action, the arrangement being such that both ends of the spring are bodily rotated at the same speed whereby creeping of the spring is prevented.

8. A clutch comprising a rotatable driving housing, a shaft to be driven, friction pads carried by said housing, a plate carried by said shaft and having a surface extending between said pads, a pair of members having wearing surfaces and carried by said housing in juxtaposed spaced relation to one side of one of said pads, an actuating device attached for movement along said shaft and including rigid pressure arms having inner ends attached in one axial plane of said shaft and also having floating outer ends provided with cam surfaces adapted to oscillate and engage the wearing surfaces of said members respectively in another axial plane of said shaft, and means for adjusting one of said members whereby to vary the distance therebetween.

9. A clutch comprising a hollow rotatable driving structure having hard surfaced elements opposed to and spaced from each other, one such element being furthermore movable relative to the other, a friction pad carried on the farther side of said movable element, a shaft to be driven, a plate secured thereto and having a portion opposed to said pad, another friction pad upon said structure opposed to the opposite side of said plate, a sleeve rotatable with said structure and also movable relatively thereto in a direction along said shaft, pressure arms pivotally connected with said sleeve, the ends of said arms being of cam formation and positioned between said elements, and means for guiding the movement of said arm ends on opposite sides, and at points relatively transverse to those where they apply pressure.

10. A clutch comprising a hollow rotatable driving structure provided interiorly with a friction element and a block spaced from and movable relatively to said element, a shaft to be driven, a plate secured thereto and interposed between said element and one side of said block, an actuating sleeve movable between said structure and shaft, one piece pressure arms having inner ends movably connected to said sleeve near said shaft and having their free ends fashioned on opposite sides with curved integral surfaces, said ends being fitted between said structure and the other side of said block, means for simultaneously oscillating said arms such that said curved surfaces are rocked against said structure and block so as to act as a cam to move said block toward said plate, and means for guiding the action of said arm ends on opposite sides.

11. A clutch comprising a hollow rotatable driving structure including a hub, a sleeve axially movable in, though rotatively interlocked with, said hub, a spring surrounding said hub and acting against said sleeve, rigid arms movably attached to said sleeve and extending outward therefrom, the free ends of said arms having oppositely presented curved surfaces, a block movably supported interiorly of said structure and adapted to confine the ends of said arms therein, a shaft to be driven, and a plate carried by said shaft and projecting between said structure and the other side of said block, the arrangement being such that said plate is normally compressed in such position, said sleeve being furthermore spaced from said shaft, whereby the firm action of said rigid arms is independent of the vibration and displacement of said shaft.

12. A clutch comprising a rotatable driving structure having a central hub and a pair of friction elements in spaced relation, a shaft to be driven and extending through said hub, a plate secured to said shaft and interposed between said friction elements, one such element being movable toward and away from the other, said hub having slots, a sleeve axially movable between said hub and shaft and provided with ears occupying said hub slots whereby rotatively to interlock said hub and sleeve, said sleeve being out of contact with said shaft, a spring around said sleeve and pressing in the direction of said ears, means for actuating said sleeve counter to the action of said spring, and means including rigid pressure arms having pivots and fulcrums respectively in radial planes of the clutch forming an angle of substantially ninety degrees and controlled by the movement of said sleeve for applying or releasing the clutching effect between said plate and elements, the arrangement being such that the action of said arms is firm notwithstanding the changing axial direction of said shaft.

13. A clutch comprising a rotatable driving structure, a shaft to be driven, a friction plate carried by and for movement along said shaft, friction elements carried by said structure on opposite sides of said plate, one such element being movable between one wall of said structure and said plate, an actuating sleeve surrounding said shaft, a spring acting to move said sleeve in one direction, one piece pressure arms having inward ends articulating with said sleeve in a given radial plane and floating outward ends each fashioned with two cam surfaces opposed to said wall and movable element in a relatively transverse radial plane, whereby to attain great leverage while requiring a correspondingly light spring and insuring an ease of action which will at the same time be firm and noiseless, and means for moving said sleeve in the opposite direction.

14. A clutch comprising a driving member, a shaft to be driven, a hub on the latter, a roller bearing race between said member and shaft, opposed friction surfaces carried by said member and hub respectively, clutch actuating mechanism for controlling the engagement of said surfaces, a washer interposed between said race and hub, and a spring for holding said washer in place, the latter being dished on the side facing said roller bearing race.

15. A clutch comprising a hollow driving structure, a shaft to be driven extending therein, friction surfaces carried by said structure and shaft and adapted to have engagement with each other, clutch actuating mechanism including a sleeve movable in an axial direction and a pressure arm having its inner end articulating with said sleeve and its outer end confined by said structure and one of said surfaces, said arm adapted to press said surfaces relatively to each other, means for actuating said mechanism, means for adjusting the movement of said sleeve and means for effecting a relative adjustment between said confining part of said structure and said shaft supported friction surface.

16. A clutch comprising a hollow driving structure, a shaft to be driven extending therein, members having friction surfaces carried by said structure and shaft and adapted to have interior engagement with each other, clutch actuating mechanism for controlling the relative position of said surfaces, said mechanism including; an actuating sleeve, a spring pressing thereagainst, and arms pivoted to said sleeve and adapted to have a duplex cam action between said structure and one of said members, and interiorly and exteriorly located means for doubly adjusting the action of said mechanism, one such means being adapted to limit the inward action of said sleeve and the other means being adapted to vary the distance between the points of engagement of said arms with said structure and opposed member.

17. A clutch comprising a rotatable driving member, a shaft to be driven, a plate carried by said shaft, separated wearing parts carried by said member, one of said parts being movable relatively to the other and adapted to engage said plate, a sleeve about said shaft and carrying radially projecting pivots, means for moving said sleeve in an axial direction, a plurality of arms each having one end movable upon one of said pivots and its other end extending between said parts and fashioned with a pair of hardened surfaces, each such arm being adapted to have a double cam action against the plate engageable part and relatively immovable part.

Signed by me, this 30th day of October, 1916.

FERGUS R. FERGUSON.